US011864130B1

(12) United States Patent
Chrabieh

(10) Patent No.: US 11,864,130 B1
(45) Date of Patent: Jan. 2, 2024

(54) METHOD FOR INTERNET-OF-THINGS COMMUNICATIONS USING CELLULAR WIRELESS LICENSED BANDS

(71) Applicant: NextNav France, Neuilly-sur-Seine (FR)

(72) Inventor: Rabih Chrabieh, Paris (FR)

(73) Assignee: NextNav France, Neuilly-sur-seine (FR)

( * ) Notice: Subject to any disclaimer, the term of this patent is extended or adjusted under 35 U.S.C. 154(b) by 0 days.

(21) Appl. No.: 16/285,093

(22) Filed: Feb. 25, 2019

Related U.S. Application Data

(60) Provisional application No. 62/636,069, filed on Feb. 27, 2018.

(51) Int. Cl.
| | |
|---|---|
| *H04W 56/00* | (2009.01) |
| *H04W 4/80* | (2018.01) |
| *H04W 16/14* | (2009.01) |
| *H04B 17/318* | (2015.01) |
| *H04L 27/26* | (2006.01) |
| *H04W 48/20* | (2009.01) |
| *H04J 13/00* | (2011.01) |

(52) U.S. Cl.
CPC ........ *H04W 56/001* (2013.01); *H04B 17/318* (2015.01); *H04J 13/0059* (2013.01); *H04L 27/2607* (2013.01); *H04L 27/2628* (2013.01); *H04W 4/80* (2018.02); *H04W 16/14* (2013.01); *H04W 48/20* (2013.01); *H04W 56/0045* (2013.01)

(58) Field of Classification Search
CPC ..... H04W 56/001; H04W 4/80; H04W 16/14; H04W 48/20; H04W 56/0045; H04B 17/318; H04J 13/0059; H04L 27/2607; H04L 27/2628
See application file for complete search history.

(56) References Cited

U.S. PATENT DOCUMENTS

| | | | |
|---|---|---|---|
| 9,497,733 B2 * | 11/2016 | Xu | .................... H04W 72/1284 |
| 9,560,645 B2 | 1/2017 | Susitaival | |
| 9,713,108 B2 | 7/2017 | Charbit | |
| 10,103,868 B2 | 10/2018 | Lei | |
| 10,117,200 B2 | 10/2018 | Chae | |

(Continued)

OTHER PUBLICATIONS

Aminjavaheri et al., "Underlay Control Signaling for Ultra-Reliable Low-Latency IoT Communications" arxiv.org:1711.02248v1 Tue, Nov. 7, 2017.

*Primary Examiner* — Michael Thier
*Assistant Examiner* — Nevena Zecevic Sandhu
(74) *Attorney, Agent, or Firm* — MLO, a professional corp.

(57) ABSTRACT

A wireless communications method synchronously transmits periodically from synchronized base stations of a single frequency network a common downlink synchronization signal (IoT-PSS) that underlays broadcasted signals transmitted in licensed bands of a cellular system, and a system frame number least significant bits signal (IoT-SFN-LSB) indicating timing of transmission of a system information block signal (IoT-SIB) that contains information related to downlink and uplink transmission schedules and allocations. An IoT device receives the common downlink synchronization signal and transmits uplink data only after receiving the synchronization signal and system frame number signal.

14 Claims, 7 Drawing Sheets

(56) References Cited

U.S. PATENT DOCUMENTS

| | | | |
|---|---|---|---|
| 2005/0064832 A1* | 3/2005 | Kogawa | H04B 7/0802 455/168.1 |
| 2006/0111127 A1* | 5/2006 | Jang | H04W 68/00 455/458 |
| 2006/0209746 A1* | 9/2006 | Asai | H04W 52/245 370/328 |
| 2008/0267137 A1* | 10/2008 | Dabak | H04W 56/001 370/336 |
| 2011/0053585 A1* | 3/2011 | Otonari | H04L 1/0026 455/422.1 |
| 2011/0188450 A1* | 8/2011 | Cho | H04W 72/0446 370/328 |
| 2013/0083685 A1* | 4/2013 | Lee | H04B 7/0647 370/252 |
| 2014/0376509 A1 | 12/2014 | Young | |
| 2016/0205644 A1 | 7/2016 | Seo | |
| 2016/0212737 A1* | 7/2016 | Jang | H04L 5/001 |
| 2016/0262123 A1 | 9/2016 | Abedini | |
| 2016/0309332 A1* | 10/2016 | Norrman | H04W 24/08 |
| 2017/0208474 A1* | 7/2017 | Mody | H04L 5/0051 |
| 2017/0311250 A1* | 10/2017 | Rico Alvarino | H04W 4/70 |
| 2017/0311326 A1* | 10/2017 | Wong | H04W 72/0453 |
| 2018/0139018 A1 | 5/2018 | Mallik | |
| 2018/0167946 A1* | 6/2018 | Si | H04L 5/0048 |
| 2018/0287844 A1* | 10/2018 | Kim | H04L 5/0053 |
| 2018/0332549 A1 | 11/2018 | Bhattad | |
| 2019/0229850 A1* | 7/2019 | Hui | H04L 1/1614 |
| 2019/0364492 A1* | 11/2019 | Azizi | H04W 4/029 |
| 2020/0259588 A1* | 8/2020 | Iyer | H04L 5/0048 |
| 2020/0259929 A1* | 8/2020 | Tellado | G06F 21/33 |

\* cited by examiner

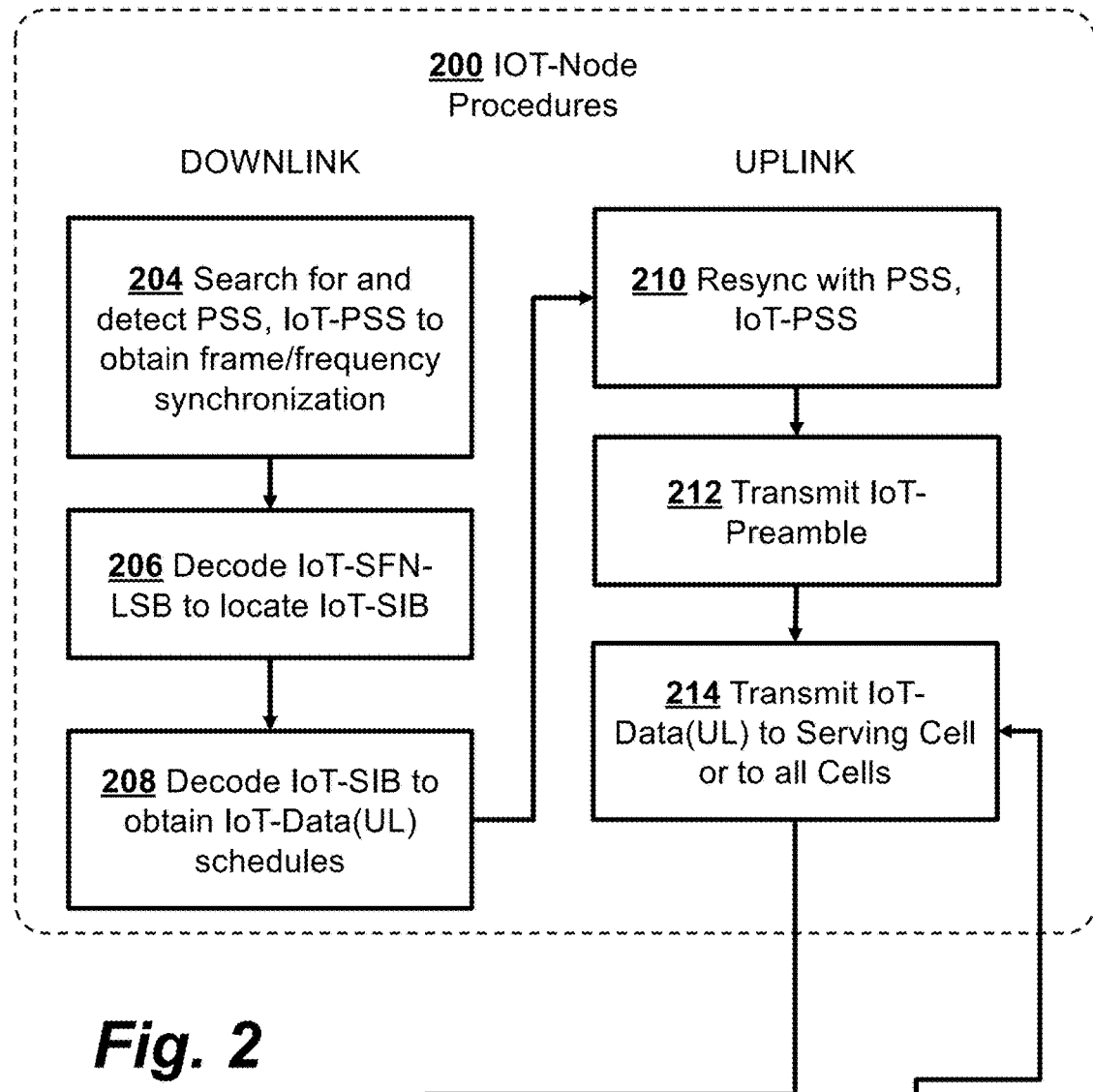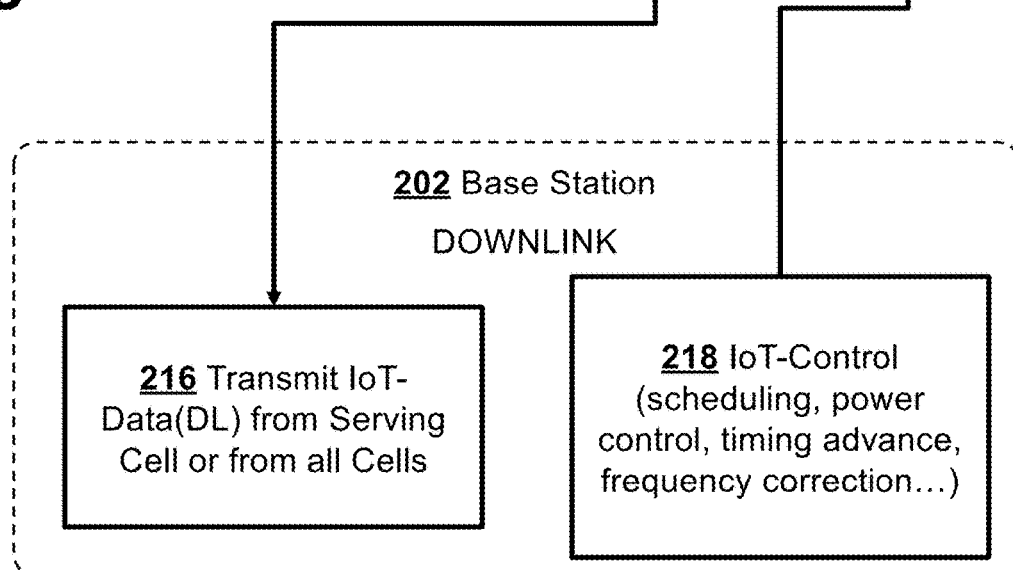
Fig. 2

METHOD FOR INTERNET-OF-THINGS COMMUNICATIONS USING CELLULAR WIRELESS LICENSED BANDS

CROSS-REFERENCE TO RELATED APPLICATIONS

This application claims priority from U.S. Provisional Patent Application 62/636069 filed Feb. 27, 2018, which is incorporated herein by reference.

BACKGROUND OF THE INVENTION

The Internet of things (IoT) is the network of physical devices, vehicles, home appliances, and other items embedded with electronics, software, and network connectivity which enable these objects to connect and exchange data.

Several communication systems and protocols exist today enabling the connection between an IoT node and a base station or gateway. However, they suffer from several drawbacks.

The unlicensed bands protocols such as Sigfox, LoRa, Ingenu, Wi-SUN, etc. do not offer a guaranteed QoS, and as the networks will become congested the connection between node and base station will become unreliable. Nodes may further waste resources and energy, transmitting at maximum power, hoping to be heard by some base stations when there is perhaps none in the vicinity (if a node is located in an area not covered by the specific network). One particular issue with unlicensed bands is that the base station cannot afford to transmit a beacon signal too frequently. And therefore, the node may have to listen for a long time before it can hear a beacon.

One advantage of the unlicensed bands protocols is the ability of a node to emit a message and let any base station hear it and convey the message to the cloud. Such a method does not work in licensed bands today unless a specific band is reserved for such objects to prevent interference with normal traffic. Network operators do not wish to allocate such bands as of today since IoT traffic is still negligible and the operator will not be able to monetize the band. Reserving a licensed band for IoT is not yet desirable.

Due to licensed band constraints, the licensed cellular wireless bands protocols such as 4G, LTE-M, NB-IOT, etc. are not able to offer an ultra-low-cost, ultra-low-power solution for the tiny nodes. NB-IOT was meant to fill this gap; however, it still requires connection to the network and to a specific cell, in addition to handover, etc. i.e., costly operations, and it is essentially losing any benefits to LTE-M. Furthermore, the licensed bands protocols such as NB-IOT waste valuable reserved spectrum, especially today before the IoT nodes start to proliferate.

Furthermore, there is a need to enable battery-less, energy harvesting IoT nodes, which can receive and transmit data during a total of a few hundreds of milliseconds every once in a while.

BRIEF SUMMARY OF THE INVENTION

We describe herein a method for IoT communications using cellular wireless licensed bands (including 4G LTE, 5G), with minimal or no disturbance to the regular communications (e.g., smartphone communication). The method leverages the existing licensed spectrum in order to provide reliable QoS to IoT nodes (devices) with limited or no impact on the network capacity.

In one aspect, the method re-uses the licensed spectrum for the purposes of IoT communications. Some of the proposed IoT signals are transmitted in code division multiple access mode, underlaying existing cellular wireless standard signals. These are the frequently transmitted signals in downlink, and used to quickly synchronize the IoT node and provide it with the time and frame structure. In some embodiments, IoT signals are also transmitted in temporarily reserved time slots or frequency subbands. These are the regular control and data messages in downlink and uplink.

The method uses a single-cell network system where all (or most) base stations provide the same service so that it appears to the IoT node as a single wide cell with multiple base stations. It is also denoted by single frequency network and sometimes referred to by star-architecture where all nodes are connected to a unique hub (which has multiple transmission/reception antennas). Downlink is broadcasted, multi-casted or unicasted identically by all base stations (using diversity techniques). Uplink is listened to by all surrounding base stations; until, optionally, link adaptation and power control in uplink and downlink favors one of the base stations, in which case other base stations may stop serving a given node. It is a LoRa or Sigfox style system but reusing the licensed band, without a dedicated spectrum allocation, and thus offering many advantages: power consumption, simplicity, diversity, handover-less, capacity, coverage, interference management (link adaptation and cell selection in a seamless manner), and QoS. The method can take advantage of off-peak time (e.g., nighttime) to exchange most of IoT traffic (low priority traffic), as well as asymmetry between uplink and downlink for smartphone traffic in order to channel more uplink IoT traffic during daytime (in often available uplink bandwidth).

This method may still use the unlicensed band on rare occasions: for example, during a first-time setup before the node knows where the licensed frequency bands are located, the node may contact the network using the unlicensed band. Or when the node can no longer hear the licensed frequency band(s) in downlink; e.g., when the node moves to an area where the licensed band(s) are different; then the node may also re-contact the network via the unlicensed band to obtain a list of licensed bands to camp onto. Optionally, rather than using the unlicensed band, a few licensed bands that are worldwide assigned to LTE IoT can be searched and selected by the IoT for initial setup and for reconfiguration.

The method assumes a synchronized network such as in the United States. It cannot function in asynchronous networks.

The method may further provide accurate geolocation service using wide bandwidth and low interference, and with minimal power consumption. This can be achieved similarly to LoRa since many base stations may hear, with little effort, the uplink signal reserved for geolocation (e.g., during uplink slots allocated to IoT). Downlink geolocation signals are also an option. In either uplink or downlink solutions, the base stations are preferably tightly synchronized (to a few tens of nanoseconds).

We also propose modulation schemes that are suitable for low-data rate networks (IoT).

In one aspect, the invention provides a wireless communications method comprising: a) synchronously transmitting periodically from synchronized base stations of a single frequency network implementing a single cell network 1) a common downlink synchronization signal (IoT-PSS), where the common downlink synchronization signal underlays broadcasted signals transmitted in licensed bands of a cellular system, and 2) a system frame number least significant bits signal (IoT-SFN-LSB) containing a portion of a system frame number and no CRC checksum, where the system frame number indicates timing when a system information block signal (IoT-SIB) will be transmitted, where the system information block signal contains information related to downlink and uplink transmission schedules and allocations.

Preferably, synchronously transmitting periodically takes place every 10-20 milliseconds. Preferably, the system frame number least significant bits signal (IoT-SFN-LSB) contains at most 7 bits of the system frame number.

The synchronization signal may underlay SSS, PSS or PBCH broadcasted signals transmitted in licensed bands of a cellular system. The synchronization signal may include a Hadamard or Reed-Muller sequence. The synchronization signal may include a ZC or CSS or CAZAC sequence with circular shifts. Preferably, the synchronization signal is designed to not interfere with the reception of broadcasted signals by standard wireless devices by more than 2 dB when the observed SNR without interference is −6 dB.

Optionally, the method may further include synchronously transmitting periodically every 160 to 1280 milliseconds from multiple synchronized base stations of a single-frequency network implementing a single cell network a system information message comprising traffic scheduling information intended for IoT devices.

Optionally, the method may further include receiving at the synchronized base stations from an IoT node a random sequence of pre-allocated subcarriers; selecting a base station and subcarrier based on highest average received power over the bandwidth of the received random sequence; and transmitting from the selected base station a downlink message informing the IoT node of assigned subcarriers to transmit.

In another aspect, the invention provides a wireless communications method comprising receiving by an IoT device from one or more base stations of a single cell network a common downlink synchronization signal synchronously transmitted periodically, system frame number least significant bits signal containing a portion of a system frame number and no CRC checksum, and system information block signal; where the common downlink synchronization signal underlays broadcasted signals transmitted in licensed bands of a cellular system; where the system frame number indicates timing when a system information block signal (IoT-SIB) will be transmitted, where the system information block signal contains information related to downlink and uplink transmission schedules and allocations; and transmitting by the IoT device uplink data (using reserved/allocated resources) only after receiving the synchronization signal and system frame number signal. Preferably, the system frame number least significant bits signal (IoT-SFN-LSB) contains at most 7 bits of the system frame number.

Optionally, the method may further include transmitting from the IoT device in an unlicensed band IoT device identification information, and receiving at the IoT device a message containing information of frequency bands that the IoT device is assigned to camp on.

Optionally, the method may further include receiving by the IoT device a message containing power adaptation and modulation scheme information, and transmitting from the IoT device uplink data using the power adaptation and modulation scheme.

Optionally, the method may further include receiving by the IoT device from several of the base stations feedback messages containing received uplink quality is levels and transmitting from the IoT device an index identifying a base station having a highest quality level.

BRIEF DESCRIPTION OF THE SEVERAL VIEWS OF THE DRAWINGS

FIG. 2 is a block diagram of communication procedures followed for an IoT node and base station, according to an embodiment of the invention.

DETAILED DESCRIPTION OF THE INVENTION

Preferred embodiments of the invention will now be described using 4G LTE cellular standard as an example. The techniques can be adapted for 5G.

Figure 1:
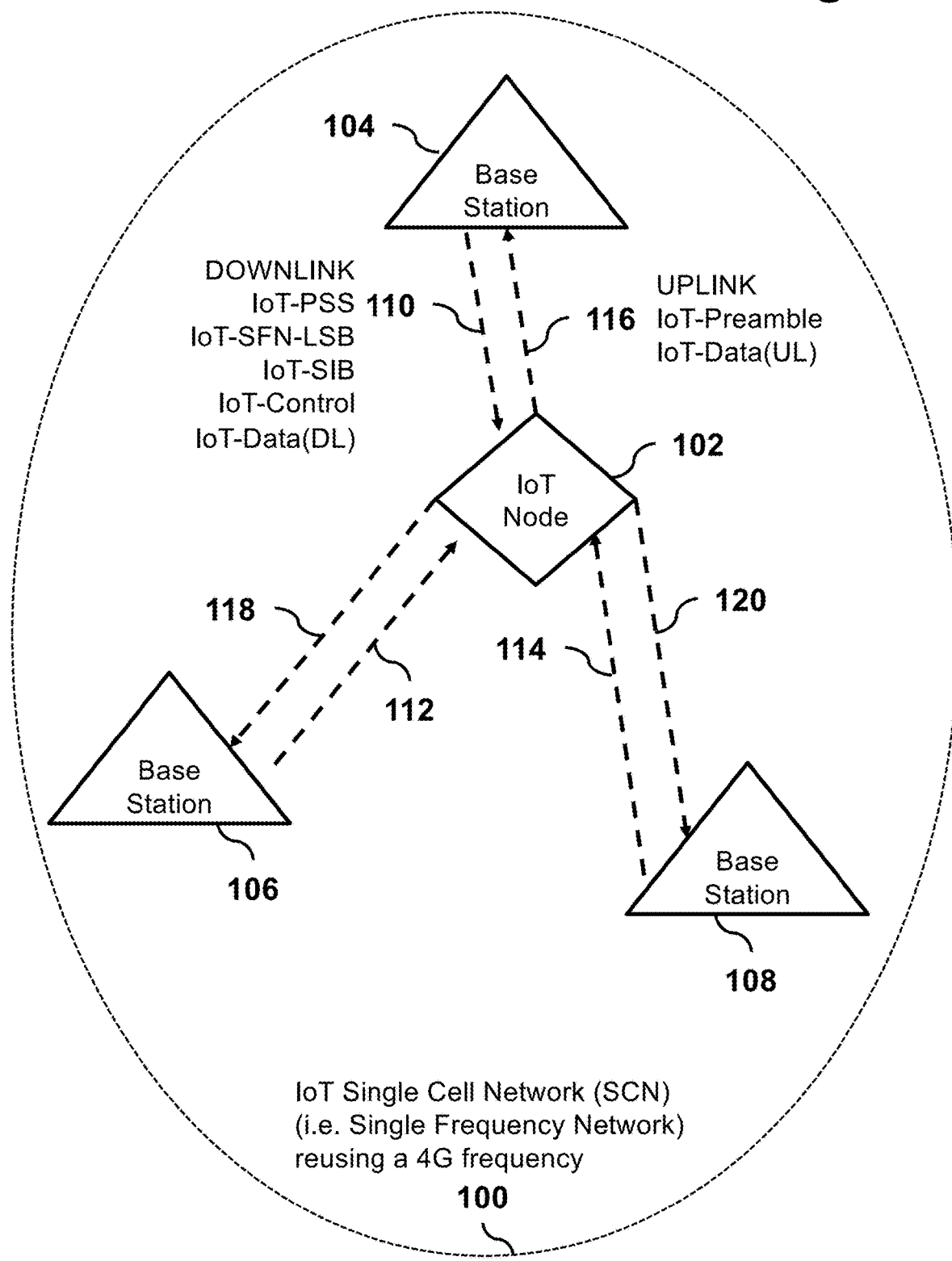
FIG. 1 is a schematic diagram showing a single cell network containing multiple base stations transmitting the same signals in the same cell to an IoT device, according to an embodiment of the invention.

FIG. 1 shows the general single cell network structure 100, reusing the licensed 4G frequency band and containing multiple base stations 104, 106, 108 transmitting the same signals in a unique cell 100. The single cell network mode is similar to the MBSFN mode of LTE (single frequency network). An IoT node 102 receives the sum of the signals 110, 112, 114 from all base stations 104, 106, 108. These signals include in the downlink: PSS (LTE signal) as well as new signals defined in the present invention such as IoT-PSS (synchronization signal), IoT-SFN-LSB (Least Significant Bits of a System Frame Number), IoT-SIB (System Information Block), and some potentially non-single network signals such as IoT-Control and IoT-Data messages. These messages are non-single network if a given base station is assigned to the IoT node for downlink transmissions (in a best effort manner in order to reduce transmitted power in downlink and reduce interference onto other IoT nodes or normal LTE traffic). In uplink, the signals 116, 118, 120 are IoT-Preamble (similar to a RACH message in LTE or to a LoRa preamble signal; usually wideband but not necessarily), and IoT-Data. In uplink, signals are typically transmitted in a single cell network, i.e., all base stations listen to the IoT-node (star-architecture), except when, in a best effort manner, the IoT node reduces its transmitted power and one or few base stations listen to its signal (battery saving, interference reduction).

FIG. 2 is a block diagram of the communication procedures followed for an IoT node 200 and base station 202 according to an embodiment of the invention. First, in step 204, the IoT node 200 searches for the PSS and/or IoT-PSS synchronization signal transmitted from the base station every about 10 ms. It locks its timing and (approximate) frequency onto this signal. Immediately following this signal is the IoT-SFN-LSB signal that indicates the least significant bit of the SFN number, thereby providing information on the timing of the IoT-SIB message. This signal is decoded in step 206. Next, in step 208, the node decodes the IoT-SIB message, located somewhere between 0 and 160 ms (or more) from the current time where the IoT-PSS and IoT-SFN-LSB were detected and decoded. The IoT-SIB provides authentication and scheduling information. When it is time for the IoT-Node to transmit its uplink, it may resync in step 210, where it will re-listen to the IoT-PSS and IoT-SFN-LSB (optionally to the IoT-SIB if a long time elapsed since last access). It then will transmit in an appropriate time and frequency resource its uplink message (either pre-allocated resource or in a random-access manner). This uplink transmission starts in step 212 with an IoT-Preamble and is followed in step 214 by the IoT-Data. The node may already be (approximately) synchronized in frequency. In downlink, the base station 202 may transmit IoT-Control and IoT-Data in steps 218 and 216. The IoT-Control messages are unicast and inform the node of the link adaptation it should use, the frequency resources it should use, etc.

Figure 3:
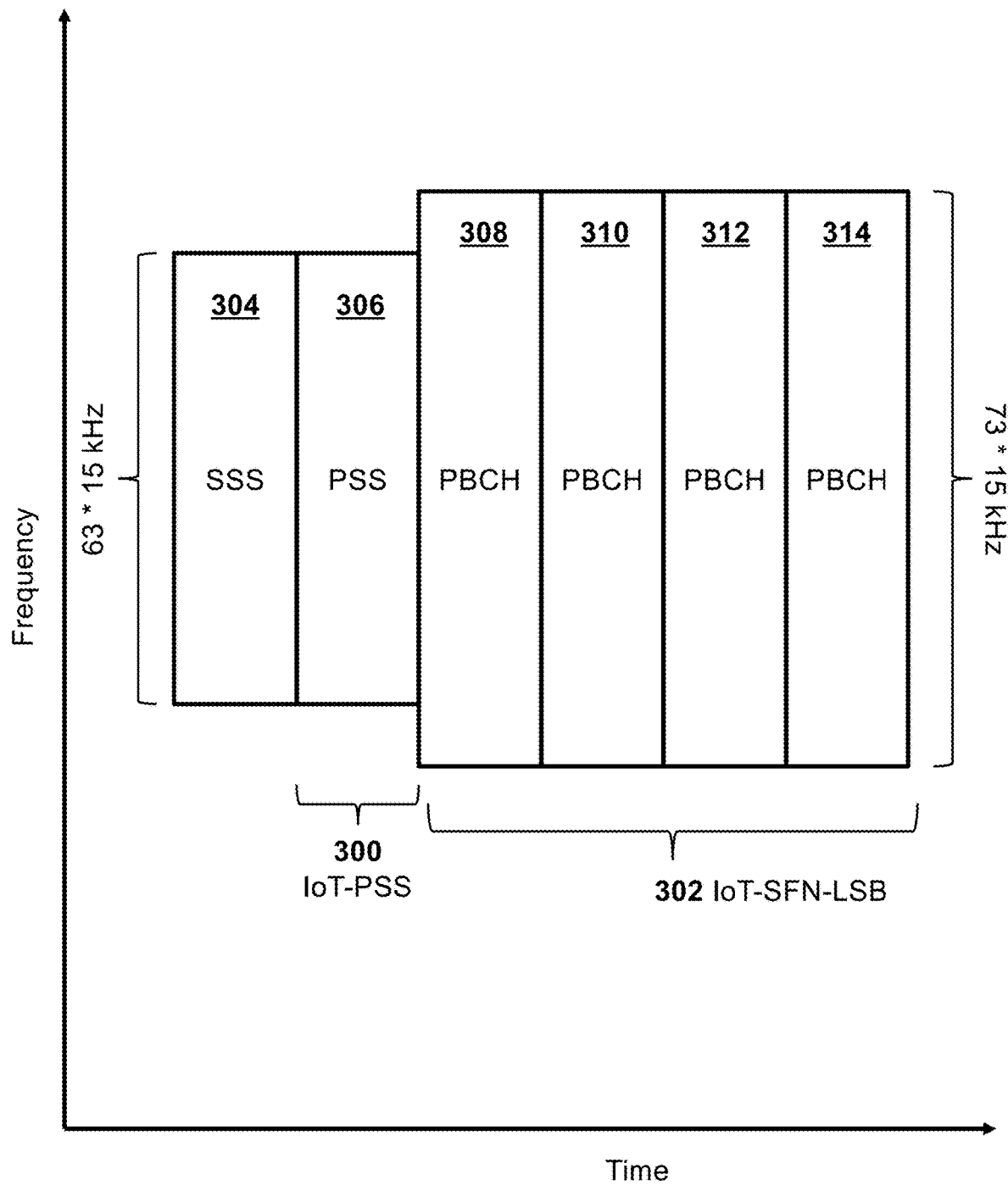
FIG. 3 is a schematic graph of frequency vs time illustrating how synchronization signals underlay LTE OFDM symbols, according to an embodiment of the invention.

FIG. 3 is a schematic graph of frequency vs time, which shows how the synchronization signals such as IoT-PSS 300 and IoT-SFN-LSB 302 can underlay the LTE OFDM symbols reserved for SSS 304, PSS 306 and PBCH 308, 310, 312, 314 signals and channels. The IoT-PSS 300 and IoT-SFN-LSB 302 are transmitted with lower power and with minimal impact on the normal LTE channels. The bandwidth is about 63*15 kHz in the SSS or PSS sections 304, 306, and about 73*15 kHz in the PBCH section 308, 310, 312, 314. The duration of each symbol is about 71 us.

Figure 4:
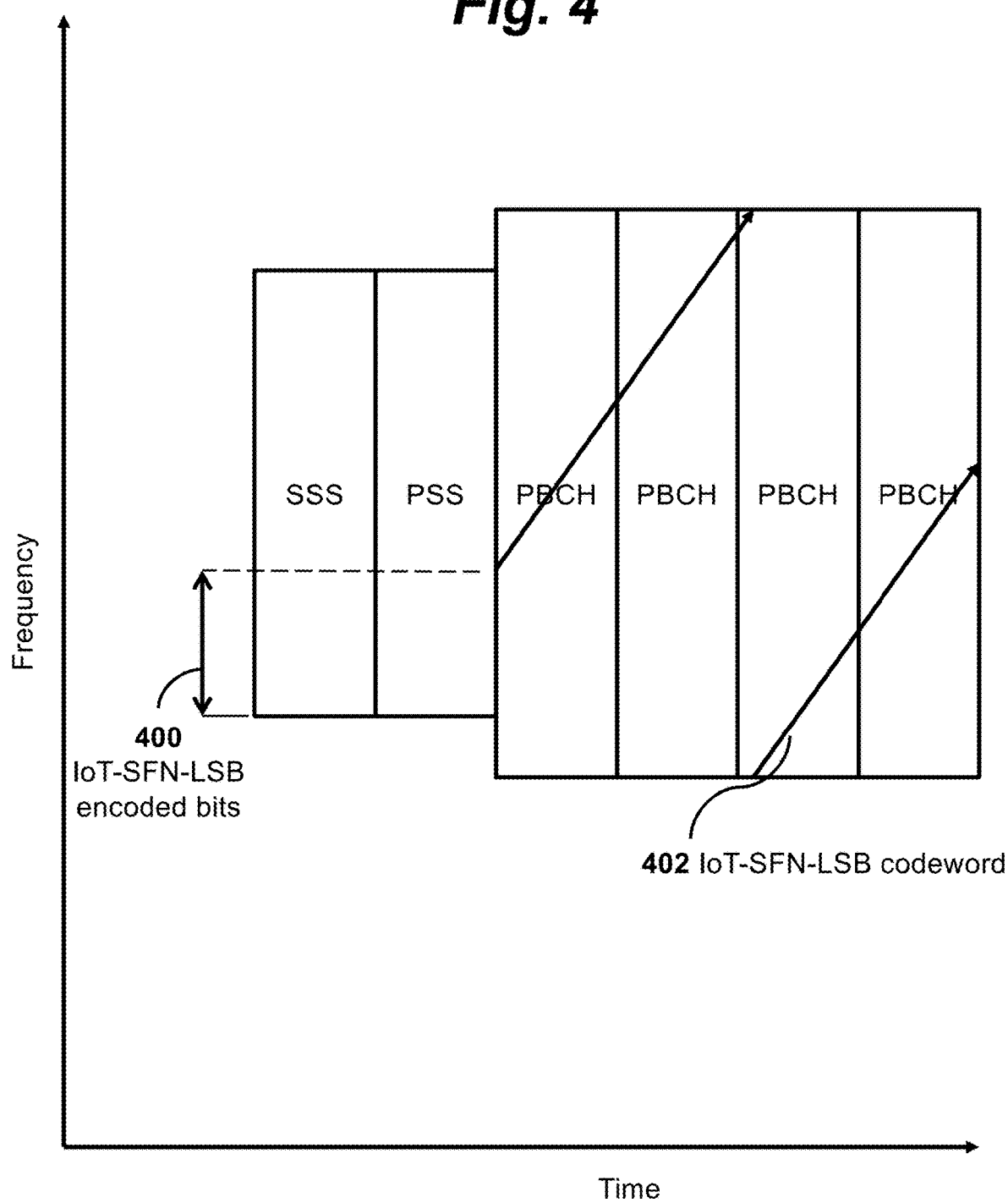
FIG. 4 is a schematic graph of frequency vs time illustrating an IoT-SFN-LSB signal transmitted as a long chirp or ZC sequence, according to an embodiment of the invention.

FIG. 4 is a schematic graph of frequency vs time, which shows an IoT-SFN-LSB signal transmitted as a long chirp or ZC sequence, underlaying the entire PBCH section and as a single symbol 402 in frequency band 400. The cyclic shift of the sequence (represented as diagonal arrows) indicates the IoT-SFN-LSB value (e.g., 0 to 15). In the case of 5G, the layout of PSS, SSS and PBCH is similar to 4G; the bandwidth, number of symbols and coding method change but overall the layout of OFDM symbols is very similar. Hence, we may apply the same solution to 5G whether we use underlay signals or not.

Figure 5:
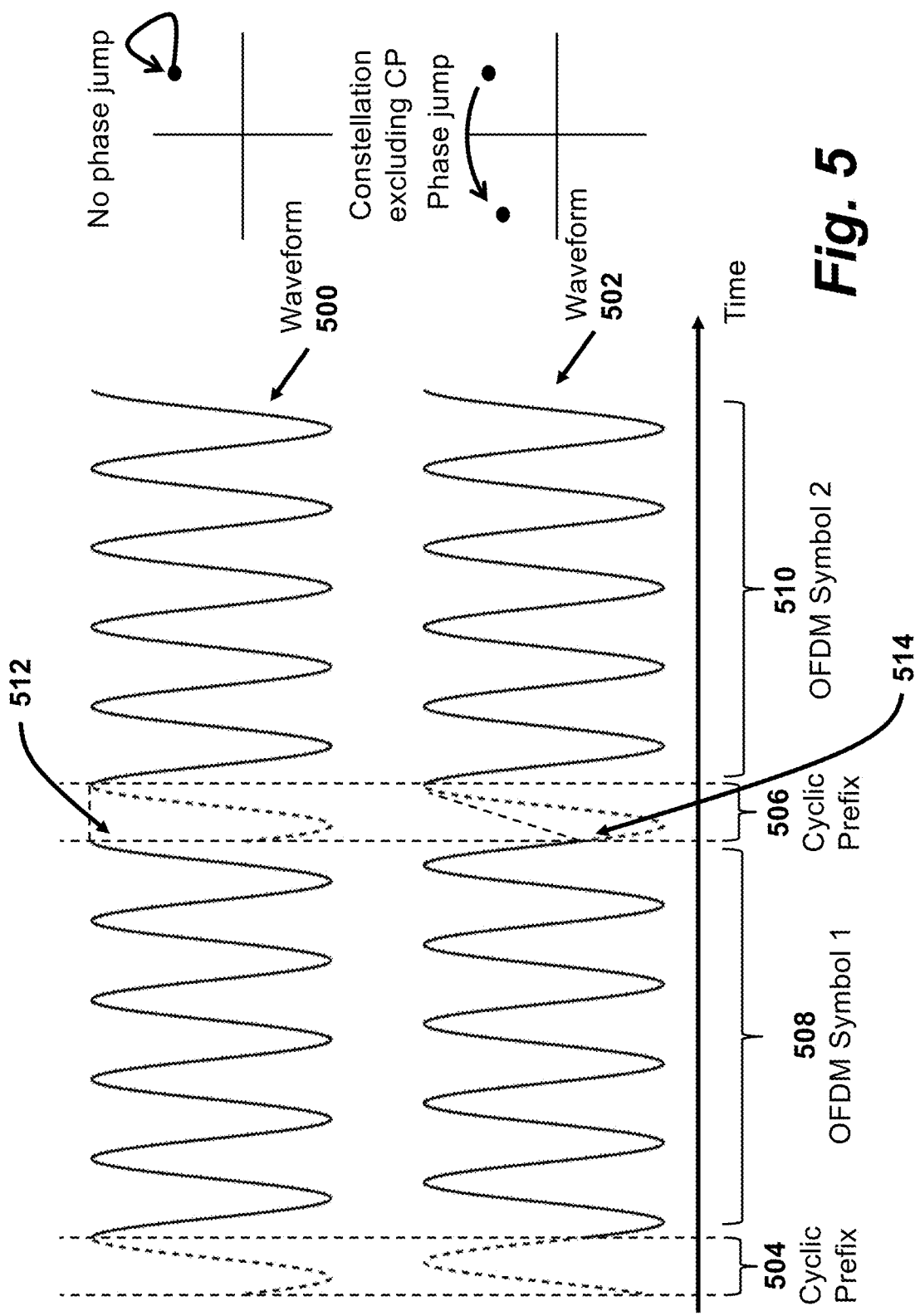
FIG. 5 is a graph of signal amplitude vs time illustrating how a normal LTE subcarrier's sinewave in time domain extends over the Cyclic Prefix (CP) and over 2 consecutive OFDM symbols, according to an embodiment of the invention.

FIG. 5 is a graph of signal amplitude vs time, showing how a normal LTE subcarrier's sinewave in time domain (waveform 500) extends over the Cyclic Prefix (CP) 504, 506 and over 2 consecutive OFDM symbols 508, 510. We only show the real part of the subcarrier in time domain (the subcarrier is in fact complex with real and imaginary parts). The frequency of the sinewave depends on what subcarrier is selected. If we include the CP 506, we observe a normal LTE phase jump (or phase break) 512 between the two symbols 508, 510. If we exclude the CP 506, the phase jump is eliminated.

In an embodiment, the IoT node in uplink may transmit a continuous sinewave such as in the waveform 502 (non-regular LTE transmission). The receiving base station, using a regular LTE FFT after removing the CP 506, will then observe a phase jump 514 between two constellation points corresponding to OFDM symbol 508 and OFDM symbol 510 (assuming the channel did not change between the two symbols); while normally for waveform 500 no phase jump is observed between the two constellation points. The phase jump's value is known to the base station and is easy to compute and undo at the base station side as it depends on the known CP length and the subcarrier's frequency. Hence, an IoT node may transmit a continuous sinewave and yet it could be picked up by the regular LTE FFT processing; with a known phase jump. An upper layer may then apply the phase correction to eliminate the phase jump before accumulating the two constellation points in order to increase SNR.

Figure 6A:
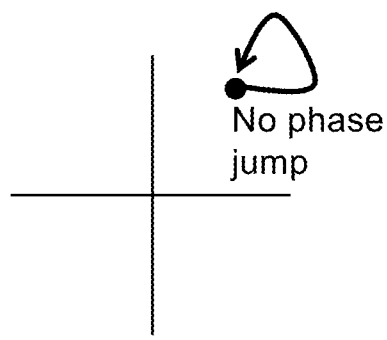
FIGS. 6A-D are phase diagrams illustrating a hop (or jump) in phase between consecutive LTE OFDM symbols, according to an embodiment of the invention.
Figure 6B:
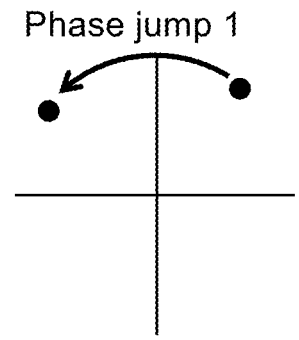
Figure 6C:
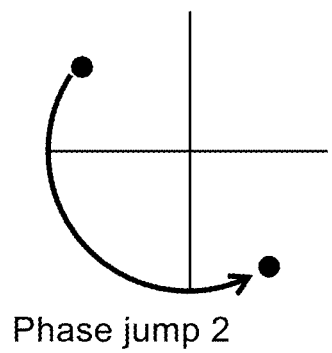
Figure 6D:
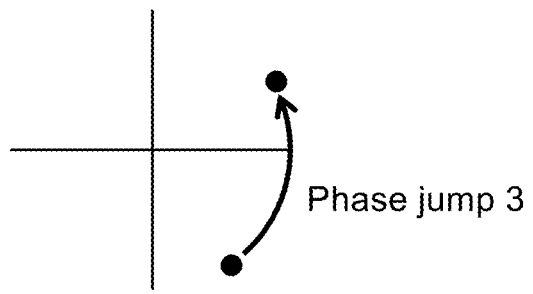

In FIGS. 6A-D are phase diagrams that show how, rather than using a continuous phase sinewave, there is a hop (or jump) in the phase between consecutive LTE OFDM symbols according to a known pattern; distinct and (nearly) orthogonal for each IoT node with respect to other IoT nodes transmitting at the same time. After correcting the phase hops sequence for a given IoT node then accumulating, the undesired IoT nodes are eliminated and the desired IoT node's data is recovered. The phase jumps may be as simple as +/−1 phase jumps and using Hadamard codes. Or constant phase jumps where the constant jump value is a function of the IoT node and such that two sequences of two distinct nodes are orthogonal. Using OVSF codes (Orthogonal Variable Spreading Factor) is also an option for the phase jumps, enabling orthogonality with different phase hopping sequence lengths (i.e., different number of symbols to accumulate per IoT node). FIG. 6A shows an example where there is no phase jump between 2 consecutive OFDM symbols as received by the base station. The transmitting IoT node, on the other hand, performs a phase jump during the CP, rather than use a continuous sinewave, in order to realign the phase at the start of the symbol. On the other hand, FIGS. 6B-D show 3 examples of 3 different phase jumps as observed by the base station. Each phase jump may denote a different subcarrier value, or some QPSK or 8-PSK phase, for example. Spreading is achieved by providing a known sequence of phase jumps for each transmitting IoT node, that are pseudo-orthogonal to other transmitting IoT nodes.

In order to reduce the issue of PAPR (Peak to Average Power Ratio) in the transmitter of the IoT node, the jump in phase between sinewaves at the edge of 2 OFDM symbols is performed during the CP time at the base station side (synchronization to the CP is needed and easy to achieve via uplink timing advance). Hence, the relatively fast transition between symbols can occur during the CP (which is of the order of several microseconds). This transition will be invisible to the base station's regular LTE FFT engine as it happens during CP time. Hence, distortions due to imperfect transition are invisible and interference due to imperfect transition onto other subcarriers is also invisible. Nevertheless, a farther base station that receives such transmission after the CP may observe some interference onto adjacent subcarriers due to imperfect transition between 2 OFDM symbols; however, such base station will be far and the interference level onto adjacent subcarriers will be even less than that onto the main subcarrier itself (which may or may not be decoded by the far base station; and which could use an orthogonal phase hopping sequence, to reduce interference onto the main subcarrier).

Figure 7:
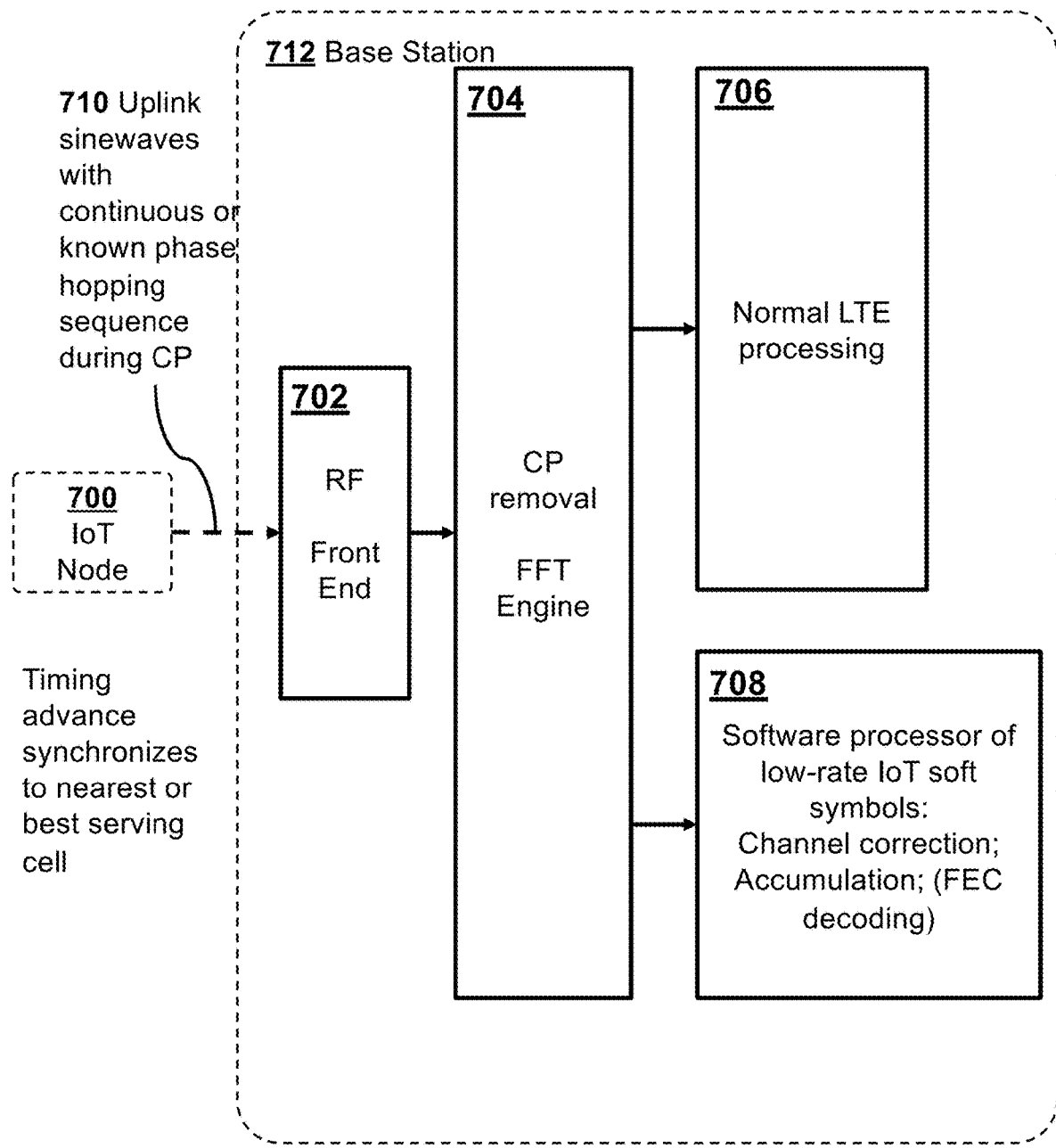
FIG. 7 provides a schematic block diagram of a base station receiver, according to an embodiment of the invention.

FIG. 7 provides a schematic diagram of base station receiver processing blocks according to an embodiment of the invention. The hardware of base station 710 is unchanged. The base station receives uplink signals 710 from IoT note 700 and processes them with RF front end 702, followed by CP removal and FFT engine 704 and normal LTE processing 706. A new processing block is a software layer 708 in or outside of the base station that is connected to the FFT engine 704. The software layer 708 is provided with the soft symbols coming out of the FFT engine 704 and corresponding to IoT traffic. The software layer corrects the channel (e.g., using DQPSK (differential) transmissions), accumulates symbols (up to the level that provides an acceptable SNR) then performs Forward Error Correction (FEC) decoding, which may be partially performed using an existing hardware accelerator if necessary (e.g., Turbo or Viterbi or Polar code decoder). The soft symbols coming out of the normal FFT engine for IoT traffic may have been interleaved over two or more spaced subcarriers for diversity, or using one subcarrier carefully selected (frequency sensitivity). Any phase transition between subcarriers occurs during CP, i.e., the IoT node is pre-synchronized to downlink and uses time advance such that it's synchronized with uplink traffic of a serving base station (nearest or best base station).

Broadcasted synchronization signal

The main concept that enables this technology is to broadcast a continuous synchronization signal (e.g., every 5 or 10 ms) that IoT nodes can, as soon as they wake up, scan, quickly detect and synchronize to within a short period of time (10 to 20 ms). This signal is designed so that it does not interfere with regular LTE signals and could be provided, in some embodiments, in some dedicated band or dedicated resources that the node can search. The synchronization signal should further provide an indication of the frame structure and when to expect the next occasion of additional broadcasted control information. E.g., additional control information, such as resource allocation schedules or system information (IoT-SIB) is available sometime between now and 1 second in the future.

An embodiment of the invention that does not waste a dedicated band or resource every 10 ms uses a method of underlaying this broadcasted continuous synchronization signal underneath the existing LTE signals with negligible impact on the LTE signals. Some of the currently existing LTE signals may be used for this purpose; however, creating new signals with much lower decoding complexity (e.g., 10× less power consumption) for the IoT node has important benefits: the node does not need to decode and estimate LTE signals including performing wideband FFTs, decoding primary and secondary synchronization signals, channel estimation and equalization, de-interleaving, decoding multiple PBCH candidates, decoding with tail-biting Viterbi decoder, etc.

Furthermore, the same broadcasted signal, underlaying the LTE signals, is transmitted by all base stations using a single cell network method; the base stations are assumed synchronized in time (synchronized network to less than 1 us, preferably; or less than 50 ns for geolocation purposes). Such signal does not exist today in LTE.

In order to increase diversity at the node's side, the broadcasted single cell network synchronization and SFN signals, by each base station, could be optionally slightly delayed, phase rotated, beamformed (or any similar mechanism such as subcarrier muting or subcarrier selection) before each transmission instance. E.g., received signals from different base stations may subtract at the node's side in one instance but add up in another instance, thereby increasing the ability of the node to hear the broadcasted signal; perhaps not on the first attempt but on the second.

PSS signal for 5 ms or 10 ms boundary detection

A good candidate for such a signal is repurposing the existing PSS transmitted by the LTE base stations. There are 3 PSS transmitted by the base stations, in a single cell network fashion or rather triple-network fashion. The IoT node could listen to all 3, accumulate them in power and detect the network synchronization with 5 ms periodicity. This procedure is low cost for an IoT node.

A preferred implementation uses a new sequence that we denote by IoT-PSS, transmitted identically by all base stations in the single cell network, the sequence being nearly orthogonal to all 3 existing PSS sequences, and transmitted underlaying the PSS by all base stations involved in the single cell network. This sequence could have equal power to existing PSS sequences or could have around 3 dB less power, for example. It could be used for channel estimation and also for synchronization in place of PSS.

The IoT-PSS could also reduce the number of candidates to be searched by the IoT node. In particular a first sequence could be used in subframe 0 near PBCH (Physical Broadcast Channel), and a different second sequence, or no sequence can be transmitted in subframe 5, which is 5 ms later. The node could then search for both or one sequence in order to obtain the 10 ms boundary.

An important advantage of transmitting a distinct IoT-PSS sequence is that if there are base stations that are not participating in the IoT network of base stations (single cell network), and if such non-participating base stations are not synchronized to the rest of the network, then the IoT node may waste energy by getting regularly confused by detecting the regular PSS sequence of such base stations.

The IoT-PSS sequence could be a Zadoff-Chu sequence similar but orthogonal to PSS sequences. It may alternatively be a hierarchical type of sequence that has lower detection cost in the IoT node's receiver, possibly with 1 or few bit quantization in time domain (e.g. +/−1). A hierarchical sequence may generate interference on LTE traffic outside of the PSS subband. This interference can be removed in the design of the sequence by setting to zero, in frequency domain, the generated interference onto such outside subcarriers; the result is a slightly distorted hierarchical IoT-PSS sequence (not exactly +/−1) but that has minimal detection cost at the IoT device side by using a +/−1 correlator.

The IoT-PSS may also extend underneath the PBCH channel (i.e., longer sequence for increased correlation gain). In particular, it could have 2 portions, one before or towards the start of the PBCH symbols, and one towards the end of the PBCH symbols. Having two sets of pilots (i.e., the IoT-PSS sequence) that are separated by a few LTE symbols enables improved frequency error estimation by the IoT node.

In an embodiment, a first IoT-PSS sequence in subframe 0 underlaying PSS, and a second IoT-PSS sequence in subframe 5, also underlaying PSS and having the same beam and same phase as (or known constant phase relative to) the IoT-PSS in subframe 0, can enable reasonably accurate frequency error estimation; the sequences being separated by 5 ms and having a known phase change in addition to the frequency error's induced phase change; by measuring the drift in phase within 5 ms we obtain the frequency error.

The IoT-PSS sequence is optional; it improves certain aspects; but the system may work with PSS detection alone.

IoT-SFN-LSB System Frame Number (defining the super frame structure)

In addition to the 5 ms or 10 ms quick synchronization, one more continuously transmitted signal, e.g., every 10 ms, is used in order to quickly and cheaply inform or point the IoT node to the time instant where additional broadcast information is transmitted (i.e., a message that points at the location of the IoT-SIB message). This can be achieved by transmitting, together with the PSS or IoT-PSS, i.e., every 10 ms, a second signal denoted by IoT-SFN-LSB (Least Significant Bits of a System Frame Number), which is an indicator, or pointer, or counter, enabling the node to locate additional control and information signals, located somewhere within a super frame structure (the super frame structure may be different from the normal LTE traffic's super frame structure; and the IoT-SFN-LSB may be different from the LSB of the LTE's SFN). In particular, it enables the node to locate the timing of the IoT-SIB message. For example, if we use the 4 least significant bits of the System Frame Number, then the IoT-SIB channel should be located every 160 ms (16 times 10 ms). For example, the IoT-SIB may be located where the IoT-SFN-LSB is equal to zero. If the detected IoT-SFN-LSB is equal to 10, then we know that 6 frames later (10+6), i.e., 60 ms later, this counter will be zero again and the IoT-SIB will be located there. Within each period of 160 ms, additional signals and information can be found in predefined and known slots, subframes and sub-bands; the node could then listen to these signals for further instructions. The pre-defined slots, subframes and sub-bands are part of the protocol and fixed; they may be changeable if the node can be informed of a few possible candidates for their position within the super frame structure (during a first-time setup, during configuration, or during reconfiguration).

The IoT-SFN-LSB is naturally a multiple of units of 5 or 10 ms (or 20 ms). Let us assume it is multiple of 10 ms, in this example. In order to count from 0 to up to 160 ms, we need 4 LSB bits in the IoT-SFN-LSB message (on the other hand, 6 LSB bits are needed if the SIB information is located every 640 ms). Let us assume it is 4 bits in the remaining of this document for simplicity.

One solution to transmit the IoT-SFN-LSB within the LTE band is by underlaying it underneath the LTE PBCH (LTE broadcasted signal decoded by regular smartphones) with minimal impact on the PBCH signal. It may be extended to also underlay the PSS signal and optionally also the SSS signal. For simplicity, we assume here that it underlays the PBCH signal only. The IoT-SFN-LSB subcarriers colliding with RS subcarriers within the PBCH section could be muted by each participating base station. Hence, channel estimation and RSRP, RSRQ measurements are not impacted for regular LTE traffic.

The LTE PBCH signal area can be located by the node after first detecting the PSS or IoT-PSS signal (every other PSS is near the PBCH; hence the node may attempt to detect the IoT-SFN-LSB after detecting each PSS or after detecting an IoT-PSS).

The LTE PBCH signal is transmitted every 10 ms by all base stations. It is different for each base station. On the other hand, for the IoT-SFN-LSB we can transmit the same signal from all base stations in a single cell network fashion. I.e., all base stations use the same IoT-SFN-LSB structure and hence they transmit the same signal in downlink (with various phase rotations or cyclic delays for diversity).

An LTE PBCH can function properly at −6 dB. If we transmit the overlaid IoT-SFN at around −3 dB relative to PBCH, the impact will be unnoticeable to regular LTE devices. Typically, there will be more interference from other base stations than from this IoT-SFN-LSB signal. Nevertheless, the measured PBCH EVM will be high. This is a consideration to be taken into account when testing the PBCH EVM. There does not seem to be a 3GPP limit on the EVM in PBCH but there is a limit on EVM in PDSCH (17% or so for QPSK while our proposal results in EVM of 70%.)

The margin can be increased to −6 dB or −10 dB of IoT-SFN power relative to PBCH to further reduce impacts on regular LTE network.

With only 4 bits to carry as opposed to 40 bits carried by the PBCH, and using a single cell network transmission method (where the signals from various base stations sometimes add up increasing the power of the IoT-SFN-LSB signal), the overall performance of the IoT-SFN-LSB can be determined in various scenarios and it should be acceptable in most cases. The gain over PBCH will typically be of the order of $10*\log_{10}(40/4) = 7.5$ dB. This gain will be reduced by a 3 dB power reduction, as well as by a difference in coding gain; but the gain will be re-increased by the single cell network method.

Nevertheless, one weakness of underlaying the PBCH signal: a regular LTE device attempts to decode PBCH at −6 dB from base station A due to a strong interfering base station B. If the strong base station B adds as well its own IoT-LSB-SFN that is 3 dB weaker than its own PBCH, this results in a further degradation of SNR observed for base station A from −6 dB to −7.8 dB (degradation by a factor of 1.5, i.e., 1.8 dB). The degradation can be limited to −7 dB if we use an IoT-LSB-SFN signal that is 6 dB weaker than PBCH (degradation by a factor of 1.25, i.e., 1 dB). Such degradation is usually OK for PBCH as it has an operating margin that could reach −8 dB. But methods for further limiting the degradation can be devised.

One particular solution is transmitting the IoT-SFN-LSB on an antenna port (i.e., beam) that is orthogonal to the port used by PBCH (assuming the base station has at least 2 antennas, which is usually the case). Another particular solution is to mute the IoT-SFN-LSB transmission every other time from a given base station, or transmit it only every ⅓ of the time, i.e., once from each sector. The muting reduces the impact on regular LTE devices from strong interfering base stations.

Combining multiple snapshots of IoT-SFN-LSB

In order to improve reception, the node can further combine multiple receptions of the IoT-SFN-LSB separated by multiples of 10 ms.

Unlike the regular PBCH transmission, no CRC is included in the transmission of the IoT-SFN-LSB. The node could verify that its reception is valid either by checking that the correlation output with the winning IoT-SFN-LSB value is at least 10 dB above noise, or by checking that the next transmission is an SFN number plus 1, modulo 4 bits (and the resulting combined correlation is 10 dB above noise).

For a node in deep indoor locations, it may need to combine multiple PSS and multiple IoT-SFN-LSB receptions before it can hear the signal. Combining multiple consecutive IoT-SFN-LSB can be performed according to Maximum Likelihood detection by summing up, from consecutive transmissions (one every 10 ms) the correlation output of each, and accounting for the SFN counter shift at each subsequent snapshot (10 ms later):

$$c(n) = \sum_i c_i(n+i) = \sum_i \left[\frac{H_i}{\sigma_i^2} \odot Y_i^*\right] X_{n+i}$$

Where $c_i(n+i)$ is the scalar correlation outcome for a hypothesis on IoT-SFN-LSB that it equals n at snapshot i=0 and therefore n+i at snapshot index i (modulo the number of bits IoT-SFN-LSB). The snapshots to be combined are i=0, ... I−1, for a total of I snapshots, one snapshot every 10 ms, and index i is relative to the node's first captured snapshot. c(n) is the total sum of the correlations for all the snapshots i=0, ..., I−1 assuming a hypothesis, by the node, of SFN=n at snapshot index i=0. The vector element-wise product $$\frac{H_i}{\sigma_i^2}$$

can be applied to the received signal $Y_i$ in snapshot i to perform channel equalization, $H_i$, and noise whitening, $$\frac{1}{\sigma_i^2},$$

to render all snapshots at same noise level. The reference sequence for SFN number n+i is denoted by $X_{n+i}$. Note that $X_{n+i}$, $Y_i$, $H_i$ are sequences, i.e., vectors (and potentially the noise term $\sigma_i$). The operator $\odot$ performs a vector element wise product between $$\frac{H_i}{\sigma_i^2}$$

and $Y_i^*$ and then we perform a dot product between the resulting vector and the reference sequence $X_{n+i}$. Channel is equalization as vector element-wise product applies to the case of frequency domain signals; in the case of time domain signals, the operator $\odot$ can be assumed to be the convolution or correlation operator. Channel estimation $H_i$ can be obtained from PSS or IoT-PSS.

For each hypothesis on the SFN number at snapshot 0, i.e., for n $\in[0,15]$, we may compute c(n) over multiple successive snapshots, n+i, and the winning hypothesis $n_0$ is the one that maximizes $c(n_0)$. If the decoding is non-coherent, i.e., without estimation of channel $H_i$, then we accumulate $c(n)=\Sigma_i|c_i(n+i)|^2$, with $H_i$ is replaced by a constant value.

Over successive snapshots every 10 ms, varying the beamforming, the phase rotation, the transmission delay, etc. by each base station contributes to increasing the diversity and the power received by the deep indoor node. Except in rural scenarios where anyways the LTE bandwidth is not fully utilized; in this case, some additional amount of the LTE bandwidth can be further allocated and reserved to transmit the IoT-SFN-LSB; or its power can be increased to 0 dB or +3 dB with respect to PBCH, since it is not substantially interfered by other base stations.

The IoT-SFN-LSB signal could have an embedded pilot sequence in order to improve the estimation of the signal in a coherent manner (by estimating $H_i$).

Alternatively, the antenna port used to transmit the IoT-SFN-LSB signal could be identical to the antenna port used to transmit the nearby PSS signal or IoT-PSS signal. In such a case, by combining all PSS from all base stations, the node will obtain an equivalent of a pilot sequence to estimate $H_i$ in order to coherently decode the IoT-SFN-LSB. This method works provided:

Either all base stations are transmitting the IoT-SFN-LSB signal. If some base stations are not upgraded or some base stations serving small cells are not transmitting the IoT-SFN-LSB signal, and if they are synchronized to the network, then the method is not as reliable (since some received PSS from the base station serving the small cell are not matched to a transmitted IoT-SFN-LSB signal).

Or a specific IoT-PSS sequence is transmitted by the base stations participating in the IoT network and hence the IoT-PSS sequence can serve as a pilot sequence for channel estimation in order to coherently decode the IoT-SFN-LSB.

Plain Repetition of IoT-SFN-LSB

A low-cost transmission method of the IoT-SFN-LSB is a simple repetition underlaying each of the 4 PBCH symbols in LTE. In this case, the node can simply accumulate the signals in time domain then compute a unique FFT thus saving processing power and battery usage. It then equalizes the channel using embedded pilot subcarriers within the symbol (or using the PSS or IoT-PSS signal as pilot, which uses one more FFT). Then it performs the final decoding of the IoT-SFN-LSB to determine which sequence out of 16 was transmitted (with optional combining over successive snapshots 10 ms apart).

In order to use a PSS sequence as pilot sequence, we assume that frequency error has already been corrected by the node prior to decoding IoT-SFN-LSB, and that all base stations are participating in the IoT network. Hence, using IoT-PSS or a pilot sequence embedded in IoT-SFN-LSB is more desirable.

The PBCH contains 72 subcarriers. In order to use all 72 subcarriers and the PSS (that uses 62 subcarriers only) or IoT-PSS as pilot sequence, then the section underlaying the PBCH should also contain pilot subcarriers at the 2 edges of the band.

Assuming, for example, that the total number of subcarriers available per OFDM symbol for IoT-SFN-LSB are 40; the rest being IoT pilots or reference signals (IoT-RS), and assuming 4 information bits are needed for the IoT-SFN-LSB, then using simple repetition of 10 per bit (BPSK), with interleaving over subcarriers, leads to a gain of 40 overall (since we have 4 PBCH symbols), i.e., 16 dB gain in AWGN (plus diversity gain in non-AWGN channels).

With respect to the underlaid PBCH, the IoT-SFN-LSB being transmitted at −3 dB, after receiver 16 dB gain, the resulting SNR is 13 dB, sufficient to decode each bit; not to mention the extra gains from the single cell network transmission.

In rural deep indoor, additional signals may be needed to increase the signal hearability. They can be available (i.e., allocated and reserved) since the capacity is not an issue in rural environments.

When combining two adjacent IoT-SFN-LSB transmissions, all bits except 1 bit (assuming Gray coding of IoT-SFN numbers) gain a further 2 to 3 dB as well as diversity gain. The problematic bit is identified (nearest to zero) and then the IoT-SFN-LSB number can be almost guessed (a transition from 0 to 1 or from 1 to 0). An additional 3 dB separates the two bits (+1 or −1) when comparing the two signals before combining. Otherwise, combining a $3^{rd}$ IoT-SFN-LSB transmission would is recover the lost bit.

Reed-Muller (RM) or Walsh-Hadamard (WH) code

An alternative to simple repetition is using a Walsh-Hadamard code of 16 sequences to encode the 4 bits of information. It provides some coding gain over pure repetition (about 1 or 2 dB).

Another alternative is a Reed-Muller or Walsh-Hadamard code [64,7,32] that provides, for example, 7 bits of information (rather than just 4 bits of information), e.g., an IoT-SFN-LSB period of 1.28 seconds instead of 160 ms, and 4 or 4.5 dB of coding gain for the code within one OFDM symbol; while the remaining OFDM symbols are repetition symbols such that a unique FFT is used after time domain combining of the 4 symbols. There is usually sufficient diversity within 1 symbol; furthermore, diversity within one symbol can be increased in a simple manner by mapping onto QPSK subcarriers: example the I channel of QPSK is given the set 64 bits of the Reed-Muller code; and the Q channel of QPSK is given the same set of 64 bits after interleaving the bits.

Note that the RM code of [64,7,32] means that 7-bit message is encoded onto 64 bits codeword and mapped onto 64 BPSK subcarriers, or onto one channel of the 64 QPSK subcarriers, or onto 32 subcarriers using 2 channels I and Q.

As an option to provide additional diversity, the IoT-SFN-LSB signal may not be repeated when underlaying each of the 4 PBCH symbols. It can be transmitted, underlaying each symbol, with differently interleaved versions in frequency domain. In this case, 4 FFT are needed at the receiver to decode the IoT-SFN-LSB rather than just 1 FFT since no time domain combining can be performed (due to the interleaving in frequency domain).

A middle way is to repeat for 2 symbols then change interleaving and repeat for 2 symbols. In this case, the receiving node can combine in time domain every 2 symbols in time domain and use just 2 FFT rather than 4. Diversity is increased while the number of FFT is limited.

An RM sequence defined in frequency domain as mentioned above requires a channel estimation training or pilot sequence in order to correct for channel distortion.

Chirp Spread Spectrum (CSS) or Zadoff-Chu (ZC) sequences (CAZAC sequences)

Yet another alternative is a CSS or equivalently a ZC sequence characterized by a frequency ramp. Using circular time shifts (delays) to encode the IoT-SFN-LSB: e.g., 3 bits are encoded using circular time shifts and 1 bit is encoded in the form of BPSK, plus a reference or training signal to serve as reference for BPSK. Or all of the 4 bits are encoded in the form of circular shifts without using a reference signal to determine the channel's phase (non-coherent demodulation). Although, determining the channel delay can still be needed and a reference sequence such as PSS or IoT-PSS is needed to provide the reference timing for the channel delay. Since 3 PSS ZC sequences cannot have same frequency ramp as one IoT-SFN-LSB ZC sequence, it can be useful to use an IoT-PSS sequence with the same frequency ramp as the IoT-SFN-LSB in order to easily determine the channel delay even in the presence of a frequency error.

An option for the ZC sequence is to transmit a unique one underlaying all 4 PBCH, which creates a bigger symbol of duration around 300 us. If we are to transmit 16 codes with 16 cyclic shifts (encoding 4 bits), then each code occupies 300/16=18.75 us, i.e., 5.6 km, which is enough separation between the cyclic shifts for a channel of this length. It can still function for longer channels that overlap onto next bins, provided the receiver identifies the "start" of the channel with reasonable accuracy, as a delay relative to the reference signal such as IoT-PSS. If a reference sequence is used for phase detection, then we only need 8 cyclic shifts (3 encoded bits) separated by 300/8=37 us each, and one bit is encoded as BPSK.

However, transmitting such ZC sequence by the base station, over 4 merged PBCH symbols, creates interference onto adjacent LTE data subcarriers since it does not follow the Cyclic Prefix format of the normal LTE PBCH symbols. One way to solve this issue is for the base station to cut the sequence in 4 symbols (according to the PBCH symbol boundaries), and for each symbol, replace the starting region normally reserved for the CP by the last part of that symbol; effectively creating symbols prepended by a CP, per the LTE specification. This modification removes the interference over adjacent LTE data subcarriers but it has the adverse effect of reducing the quality of the transmitted ZC sequence (since it creates some distortion equivalent to adding noise). The frequency ramp of the ZC sequence could be selected in such a way to minimize the impact of this modification. The receiving node may try to decode the sequence as if it is an unmodified (undistorted) ZC sequence in order to keep processing requirements low.

A better option at the base station transmitter is to obtain the wideband FFT transform of this 4 symbol-long ZC sequence and to set to (almost) zero the interference it generates outside the PBCH bandwidth, i.e., onto the other subcarriers used by normal LTE traffic. Effectively, the ZC sequence is pre-distorted to reduce interference on non-PBCH LTE subcarriers.

The mapping of IoT-SFN-LSB bits onto cyclic shifts can be done in increasing order, in reverse (decreasing) order, or any pseud-random order; however, the order should be known to the IoT receiver.

In particular, the normal increasing order, means an SFN value of 0 maps to 0 cyclic delay, an SFN value of 1 maps to 1 cyclic delay unit (or 1 bin), an SFN value of 2 maps to 2 cyclic delay units (or 2 bins), and so on. In this case, for a subsequent IoT-SFN-LSB in the next frame, 10 ms later, the same signal is transmitted but with a cyclic shift of +1 bin. In order to increase SNR at the receiver, it is then sufficient to accumulate the signal, coherently (with channel estimation and equalization) or non-coherently, from two consecutive receptions of IoT-SFN-LSB after cyclic shifting the second transmission at the receiver side by −1 bin to align it with the previous reception.

Cyclic shifts of M-sequences

Similar to ZC sequences, time domain binary M-sequences (or other multi-level sequences) can be used with various cyclic time shifts to encode IoT-SFN-LSB bits. Interference generated outside the useful subband (PBCH) is zeroed at the base station side before transmission.

Channel estimation

A special care should be given to the sequence enabling channel estimation given that the SNR is very low. Among the options are the PSS or IoT-PSS sequence itself used for channel estimation. It has sufficient power, in principle.

Alternatively, some symbols underlaying the PBCH area could be used for channel estimation.

Non-coherent demodulation, i.e., without using a channel estimation sequence, is possible if ZC sequences (codewords) are used without BPSK or QPSK encoding. But a reference sequence is still needed to determine the reference starting cyclic shift (i.e., delay).

A summary of the IoT-PSS and IoT-SFN-LSB signals

A continuously broadcasted signal carries a synchronization signal IoT-PSS plus the LSB (Least Significant Bits) of the IoT SFN (system frame number dedicated to IoT) that we denote by IoT-SFN-LSB.

The broadcast is done in a Single Frequency Network Mode underlaying the regular network, i.e., all base stations transmit the same signal (we can denote it by SFNM to distinguish from System Frame Number, SFN).

Existing standardized solutions don't use SFNM mode to transmit the IoT SFN and they transmit the full IoT SFN (not LSB) plus other information, with a CRC check; which results in high decoding complexity of the PBCH that we wish to avoid. In contrast, the present techniques transmit a CRC check and let the IoT node detect errors by efficiently combining the detection of 2 or more adjacent instances, or by verifying that the output correlation is at least 10 dB above noise.

The present techniques transmit a synchronization signal frequently (i.e., every 10 ms or so). In contrast, Qualcomm patent (U.S. Pat. No. 9,497,733) does not use an IoT-SFN-LSB and transmits a synchronization signal infrequently (e.g., every 200 ms to 600 ms). E.g., The result of this longer period between synchronization signal transmissions is that when the IoT node wakes up, it needs a longer reception time to resynchronize (if it fails to decode one instance, then reception time doubles in order to locate the next synchronization instance). Battery consumption increases. Note that IoT devices using low-cost energy efficient crystal oscillators without temperature compensation can drift quickly when asleep and can lose synchronization within hours or within a day. Hence, the search for the infrequent synchronization signal lengthens and the IoT node's receiver's power consumption increases. Especially if the IoT node needs to wake up regularly to check for possible downlink paging messages.

System control information (IoT-SIB)

Once the node synchronizes to PSS or IoT-PSS and decodes the IoT-SFN-LSB, it learns the position (i.e., frame and subframe position relative to the current 10 ms frame and subframe) of the System Control Information Block. It is at fixed position within the 160 ms period.

The system control information is a downlink subframe of about 1 ms or longer, or a partial subframe where only the center 1 MHz or center 5 MHz is used (fixed known bandwidth), for example. More resources could be allocated to the IoT-SIB, in additional frequencies or in additional subframes; either at prefixed and known resources, or via pointers from the first IoT-SIB to the extended IoT-SIBs that may be located a bit later.

The control information in the IoT-SIB includes some or all of the MSB bits of the full SFN number, an identification/authentication code of the network such that the node learns if it is allowed to transmit on this network or not (this is not necessary if authentication occurs on the unlicensed spectrum). It also contains information on where are the downlink and uplink allocations for IoT transmissions. It is an option to provide the scheduling information during the one-time setup procedure over unlicensed spectrum; in this case, the IoT-SIB provides only an ID code confirming that the information obtained from the unlicensed spectrum is still valid; if the code changes, then the node will have to return to the unlicensed spectrum in order to obtain the new scheduling information along with the new code.

Other control information may be broadcasted via the IoT-SIB message.

All base stations transmit the same IoT-SIB message at the same time (using diversity schemes). A checksum CRC can be included in the IoT-SIB message decoding for validation.

The IoT-SIB may use a typical LTE-MBSFN structure (with full or partial bandwidth). The broadcasted messages are indeed similar to LTE-MBSFN type of messages. Repetition can be used to increase deep indoor coverage. A convolutional or polar code may be used with some coding gain.

The detailed modulation and detailed message content of the IoT-SIB is not discussed in this application.

In summary, once the synchronization is achieved, the IoT node knows where to locate the IoT-SIB containing further information.

The IoT-SIB may contain information on the network, e.g., a (short) network identity, enabling to authenticate the network; whether the IoT node is allowed to transmit onto this network, which is useful in worldwide roaming situations. This feature enables fast authentication by the IoT node without wasting its transmission resources on an unauthorized network (e.g., in roaming situations).

Other useful information is where to locate the uplink transmission region such as a IoT RACH channel (Random Access Channel). RACH can be allocated at various timings, with different access priority levels (e.g., low priority IoT nodes may only connect at night time when resources are not scarce).

Traffic allocations

Most low-priority traffic allocations will be reserved for night time during smartphone off-peak traffic. Hence, the valuable operator spectrum is reutilized in the most efficient manner. Most nodes will learn that they need to wake up sometime during the night in order to transmit their messages. These are the low priority traffic (low-priced connections), e.g., the water and gas metering devices. It could also be the agricultural sensor that remembers information throughout the day then sends the report at night time provided there is no urgency.

For more urgent traffic, such as alerts, some bandwidth is allocated throughout the day (dedicated uplink and downlink (partial) subframes). Such day time connections will be provided by the operator at a premium price.

Furthermore, for smartphones the uplink traffic is not as high as the downlink traffic; while the opposite is true for IoT. Therefore, for IoT alert type of message, some uplink bandwidth can be reserved during daytime with minimal corresponding downlink traffic. The remaining downlink bandwidth is reserved to smartphone devices.

Note that from the operator's point of view, a smartphone subscription is about 30 euros per month and consuming far more than 100 MB. This is less than 0.3 euro per MB. On the other hand, an IoT node consuming 100 bytes per day and a subscription of 2 euros per year is 55 euros per MB. Therefore, it appears that IoT traffic can be more lucrative than smartphone traffic. Nevertheless, until the number of IoT nodes skyrockets, the operator may not want to allocate a full band for the IoT nodes. Hence, our proposed solution is ideal in that it provides an incremental increase in the capacity of the network to handle IoT traffic without dedicated allocation in the early days of the IoT deployment.

Special allocations are reserved for random access (possibly similar to or reusing LTE's RACCH). During these allocations, the node makes itself known to the network, and it can be heard by multiple base stations.

Uplink random access channel

There exist several random-access schemes in LTE, LTE-M and NB-IoT. We propose solutions suitable for SFNM with multiple base stations listening and enabling cell and frequency selectivity, i.e., automatically selecting a good base station and good frequency subband.

Pre-allocated uplink LTE subcarriers are spread across a portion of the bandwidth (non-narrowband for increased diversity). An IoT node selects and transmits a random sequence, which contains the subset of pre-allocated subcarriers, transmitting one subcarrier at a time in some pseudo-random order (where the pseudo-random order is known at the base station side).

For static or semi-static IoT devices, this scheme enables identifying the best base station and best subcarrier(s) within the bandwidth. For moving devices, this scheme is less interesting.

Once the best base station and best subcarrier(s) are selected, a downlink message from the best base station informs the IoT node on what subcarriers to transmit, as well as how to tweak its power level. The best base station can then take over (other base stations may stop serving this node) and communication between the best base station and node takes place. Note that the best base station may be selected based on highest average received power over the bandwidth. While frequency selectivity may mean selecting the best subcarrier(s) for this best base station.

Downlink unicast transmissions may be sent from one or multiple base station. The acceptable latency is high and therefore the network may have sufficient amount of time to program multiple base stations to transmit the downlink message.

The network may also decide that a particular base station is the best suited to transmit to a given IoT node, based on the received signal strength from this base station, and therefore the downlink traffic may be provided from this base station alone. Other base stations may mute, or they may transmit data to other nodes provided interference is properly managed.

Uplink data transmissions could also be reduced in power levels such that they reach one base station rather than flood the entire area. This involves the use of feedback on the downlink that can be slow or fast. The choice of the best base station at each moment might be delayed by about 100 ms or more, however.

Timing advance

The cellular system may indicate to each node that it needs to advance its timing in order to fall precisely in the uplink region provided to the IoT nodes (without interfering with other traffic). This can be done using an LTE RACH procedure (or equivalent) and then using the best serving base station.

Timing advance is not needed if the network reserves some guard time after the IoT transmissions. By grouping the IoT transmissions into a few uplink subframes, only a few guard periods are needed. Although for very large cells (20 km, for example, equivalent to 60 us, or double the amount for the round-trip delay), the guard period may be quite long. Nevertheless, this happens typically in rural environments where capacity requirement is low and reserving a long guard period is not a problem.

Non-moving nodes with low priority traffic (low cost connection)

Such traffic is reserved for off-peak hours. The node wakes up at an approximately known time before its pre-allocated slot (which can be pre-allocated in a periodic manner). It re-detects PSS (IoT-PSS) and IoT-SFN-LSB and hence finds its precise allocation timing. It may need re-decoding the IoT-SIB if timing drifts beyond the IoT-SFN-LSB period, or if it needs to check with its allocation is still valid (an information that can be carried by the IoT-SIB). Then it gets synchronized with the network and it fine tunes its timing just before transmission. If its timing advance is known (fixed node), it may not need a RACH procedure and can reuse a previously stored timing advance. Timing advance is not needed if the network reserves a guard time after IoT uplink transmissions.

Its allocated resource or resources to pick from are either a fully reserved resource at a prefixed point in time, or a shared resource with a group of other nodes and using random access. For the pre-allocated resource, the IoT node may have to check a short downlink message (e.g., carried by IoT-SIB) to ensure the pre-allocated resource has not been canceled.

Therefore, the uplink transmission takes place as follows: either random transmission with potential collisions; or pre-scheduled transmission with no potential collisions.

Frequency selectivity and IoT-Preamble

The uplink transmission can further include a first part, IoT-Preamble, during which the node transmits a chirp or a set of subcarriers spread across the allocated bandwidth (1 MHz, or 20 MHz, for example). The chirp has several disadvantages in this case as it allows for fewer nodes to transmit. Moreover, a time domain flat chirp may not be orthogonal to regular LTE traffic if the full bandwidth is not allocated to IoT. A preferred method may be a transmission over a selection of subcarriers (possibly widespread), one subcarrier per OFDM symbol, with Cyclic Prefix. This ensures the transmission remains orthogonal to regular LTE traffic if present and simplifies the base station receiver processing; e.g., using a post-processing of received subcarrier symbols obtained from the output of the FFT, which is already used for normal LTE traffic.

In uplink, an IoT-Preamble may precede data transmission as a possible replacement for LTE-RACCH. The IoT-Preamble of duration one to several milliseconds uses a relatively wide bandwidth, e.g., a CSS or ZC sequence, or a succession of pure tones spread across the time and across the bandwidth. The base stations detect the IoT-Preamble, synchronize to the node, and then listen to the rest of the message. The rest of the message maybe at node-selected frequencies and time positions (possibly randomly selected based on the position of the IoT-Preamble), or it may be at dynamically allocated frequencies by the network based on frequency selectivity and downlink feedback from the base station(s).

When transmitting the IoT-Preamble for one or more milliseconds and on several subcarriers (in succession) spread across the allocated bandwidth, base stations serving all surrounding cells are pre-scheduled to listen to the transmission. Each base station then decides which subcarrier is best suited for the node. The best received subcarrier with highest received signal strength provides frequency selectivity information. By selecting the best subcarrier, we obtain a gain of 1 to 4 dB in frequency selective channels with respect to a chirp or diversity scheme using multiple subcarrier transmissions. Furthermore, there will be no need for diversity schemes, i.e., we cut the uplink transmission duration by about 3 compared to Sigfox, for example, which saves battery.

However, such a scheme requires quick feedback from the base stations to keep reselecting the best subcarrier, every 10 to 100 ms; moving nodes should not be assigned the frequency selectivity mode.

First, the best base station is selected out of all the base stations that heard the node. This is based on maximum average power received by the base stations. Then this base station will remain the selected one during the packet transmission until possibly another base station reports that it has better reception and then it can take over the role of serving base station; this is done in a manner invisible to the node.

The serving base station feeds back regularly to the node what is the best subcarrier the node should use (or the block of adjacent subcarriers to use).

The initial transmission could hop the block of subcarriers for diversity. As soon as a base station discovers a preferred position, it feeds back the information to the node, which then sticks for a while to a fixed subcarrier and adapts the power level, modulation and coding scheme to the link in order to quickly transmit its packet and go back to sleep.

In off-peak hours, downlink bandwidth is available for frequency selectivity feedback. In peak hours, when downlink bandwidth is not available, feedback is reduced and uplink messages could be transmitted with hopping rather than frequency selectivity.

Multi-user detection

The base station may employ multi-user detection to subtract a strong user's signal before decoding a weaker user's resource block when collision between the blocks occurs.

In unlicensed band, however, most interference can be expected from different type of technologies unknown to the base station. The multi-user detection provides most of its benefits in licensed band.

Link adaptation

Link adaptation can be implemented where the downlink message also informs the node of the modulation and coding scheme, and power level to use in uplink. This substantially increases network capacity, if needed. It also prolongs battery life since the message can be shorter when the modulation does not need a lot of repetition.

Fast link adaptation and frequency selectivity

Uplink

Before the network selects the best serving base station, it is possible to let the node quickly select one; this is a fast method using node-assisted base station selection.

In order to be able to do so, each base station may feedback its average uplink received power level or quality level to the node. A reserved downlink channel may convey this information to a given node (unicast). The channel is multiplexed by the multiple base stations via Hadamard codes, CSS, CDMA or other mechanisms. Each base station using some Hadamard or other code index (collisions may occur; the network has to manage indices to avoid collisions during a transmission to a given node). The node then reports back the Hadamard code index of the strongest base station. Other base stations stop acting as serving base stations and the selected base station takes over. This scheme does not need network involvement except for the selection of the indices of the involved base stations; such selection need only be performed every now and then.

Downlink

The IoT node feeds back to the base stations (all listening base stations) that the received power can be decreased by a certain amount. Then all base stations (or the unique base station) involved in transmitting the signal to the IoT node decrease their transmission power by the given amount.

In other words, a unique downlink power control message transmitted to all base stations is sufficient to control the power level in downlink and thereby to reduce unnecessary interference on remaining nodes and devices in the network.

Uplink/Downlink

It may also be possible to define 2 different serving base stations, one for uplink and one for downlink. But control channels need to be assigned to each in the reverse direction.

Again, each base station transmits its preferred modulation scheme and power control and the node selects the best one (from a network capacity perspective), potentially with the best subcarrier (or subcarriers block) in the case of frequency selectivity mode. The network preselects the base stations that communicate with the node in terms of downlink control signals, downlink data and uplink data. Each base station acts as if it is alone in the network but the node selects the control message from the base station that is best for the network capacity and transmits according to it. All neighboring base stations, however, listen anyway. In other word, it is a node assisted control signaling (since it would take time to let the base stations communicate over the backbone). They may stop listening after a while if the network assigns a unique serving base station to the node (the best base station).

Moving nodes or high priority traffic (e.g., alerts, more expensive connection)

The system can work as above without the frequency selectivity if the node is moving fast. The allocations are spread out throughout the day with a (partial) subframe allocated every about 0.5 to 1 second. A first optional RACH procedure is performed to obtain an allocation. Otherwise, the high priority IoT node can send its message without worrying about other traffic; the base stations listen, capture the signal and forward to the network/cloud. Such transmissions occur in pre-allocated subframes and subcarriers; the IoT node obtains the scheduling information from the downlink IoT-SIB message.

For moving traffic where timing advance procedure is inconvenient to perform, special allocations are reserved with a reduced symbol size in order to prevent overflow onto adjacent symbols. Multiple symbols may also be combined into longer symbols while maintaining subcarrier orthogonality to regular LTE traffic, if present in same OFDMA symbol (e.g., via a guard band or waveform shaping or other).

Random access section

Certain subcarriers in certain subframes are reserved for random access; some for high priority with less capacity but frequent occurrences; and some for low priority with more capacity but with fewer occurrences. The random-access section can either be used to exchange control messages in order to reserve scheduled recurring slots at night time, for example (during off-peak hours), or to transmit data (high or low priority alerts). Scheduled slots may be used either for uplink traffic or for downlink paging and traffic.

A scheduled slot off-peak includes a number of subframes using 1 or more subcarriers. The first few subframes assume multiple subcarriers allocated, usually spread across the bandwidth; they are useful for uplink transmission of preambles. The remaining subframes may assume multiple, few or one subcarrier allocated in a dynamic manner, based on how the base stations are able to track and feedback link adaptation and frequency selectivity to the node.

Narrowband tones

In order to use narrowband tones such as those used by SigFox or NB-IOT, without having a disadvantage of not being orthogonal to LTE adjacent data subcarriers, we may use, with minimal changes to the base station (eNB) receiver, a usual LTE one tone, 15 kHz subcarrier, to carry uplink or downlink data over multiple OFDMA symbols. One data sample is mapped to one OFDMA subcarrier within one OFDMA symbol and has a symbol duration of 1/15 kHz plus the usual Cyclic Prefix (CP) duration. If the sample is repeated over next symbols as all ones, this is equivalent to a narrowband tone although it can be invisible to the eNB, which reports each sample separately to a post processing unit (a slightly improved performance can be achieved if the eNB takes advantage of the additional CP in this case).

In uplink, the tone is a normal narrowband tone if phase continuity is maintained across symbols and across CP. If so, the post processing unit may have to correct for the phase reported by the eNB, which can slowly drift due to the CP presence. Note that the CP is simply an extension in duration of the tone; however, normal eNB processing would ignore it. Providing phase continuity can enable the eNB to take advantage of the CP although this creates additional burden to the regular FFT processing. By ignoring the CP, the eNB FFT engine is unchanged. The eNB simply reports the measured phase and amplitude on a given subcarrier that may have been assigned to an IoT node. The eNB normal processing does not have to do anything else related to data demodulation. But the post processing unit needs to correct for the phase drifts. Of course, the eNB may perform the processing itself with slight gain in performance by accounting for the CP.

One option for the narrowband tone is to hop across frequency in order to increase diversity. The post processing unit can handle the hopping sequence.

The hopping sequence may define a Hadamard code, a CSS or ZC sequence, or other types of codes that increase diversity while enabling multi-user transmissions with pseudo-orthogonal codes. For example, if the frequency hops from one OFDMA symbol to another increase regularly by a fixed number of subcarriers, the code is analogous to a CSS sequence. Alternatively, a regular phase hop but using the same LTE subcarrier can emulate a narrowband tone at a small shifted frequency offset (e.g., shifted by 100 Hz). Then multiple IoT nodes can be assigned to different frequency offsets depending on the phase jump amount.

In summary, for uplink transmission over a given subcarrier during a given OFDM symbol, a simple solution that only requires software upgrade in the base station involves the IoT node transmitting over one or more subcarrier(s) within one OFDM symbol and aligned with the normal LTE traffic, including the cyclic prefix. The base station receives such subcarrier within its usual FFT without interference onto other LTE subcarriers. If the subsequent transmission in the next symbol occurs over the same subcarrier, the IoT device may maintain phase continuity between the two OFDM symbols. Then the base station may evaluate the phase change between the two OFDM symbols due to phase continuity and correct for this phase change (there is a phase change due to the cyclic prefix).

Time drift and scheduled slot

When a node is scheduled to wake up after 24 hours, for example, if it can correct its clock error to about 50 ppb (by measuring frequency offset or its time drift from previous sleep cycles), then after 24 hours the drift is about 4 ms. For 500 ppb (assuming movement, and/or clock error) the drift is about 40 ms. These figures are smaller than the 160 ms period of the IoT-SFN-LSB period. Therefore, upon waking up, the node checks the current IoT-SFN-LSB, correct its clock, and re-sleeps until it's the right scheduled time. It should ensure it wakes up about 40 ms prior to the scheduled time in order not to miss it. When it wakes up for the scheduled time, with accuracy of a micro-second or so, it may check a downlink control message before it starts transmitting. If the downlink message is not present, then it can assume that the scheduled slot was canceled. In this case, it could re-sleep for another 24 hours (after re-adjusting its clocks and frequency error). Or it may choose to locate the random-access section in order to transmit its information in the random-access section.

The scheduled slot could also be used in downlink for paging information and downlink traffic (as well as in uplink for uplink data).

More drifts can be handled either by decoding the IoT-SFN-MSB in order to check for more than 160 ms periods (available in the IoT-SIB); or by the system adding more bits to the IoT-SFN-LSB such that decoding provides an SFN number modulo 1.28 second rather than modulo just 160 ms. In such a case, the IoT-SIB could be located more than once per IoT-SFN-LSB period; e.g., every 160 ms while the period is 1.28 seconds.

LTE base station (eNB) modulator/demodulator

A software upgrade to the LTE eNB is usually sufficient to handle all of the proposed schemes because sampling rate remains low for low-power IoT traffic and software processing is feasible.

One proposed modulation is a pure tone (or multiple adjacent tones) of duration one LTE OFDM symbol with CP prepended compatible with the LTE eNB modulator/demodulator. The pure tone is repeated over as many consecutive symbols (with or without hopping) as needed in order to reach the necessary link budget. Such a modulation is very simple to decode by the eNB: it is sufficient to use its regular FFT/iFFT for normal traffic and to collect the subcarriers corresponding to the IoT node; then it can combine them coherently for 0.5 ms to 10 ms to obtain one bit (or more; as needed by link adaptation and power control). Afterwards, the bits are passed to a software post-processor performing DBPSK or DQPSK coding/decoding, and then to an interleaver and convolutional coder/decoder. The low level is similar to LTE and LTE cat-M, intermixing IoT and regular LTE traffic within the bandwidth, over separate subcarriers, with a higher-is level post-processor combining the bits from various symbols, using differential encoding (DBPSK, DQPSK) or a training sequence, in order to recreate the full packet received in uplink from the IoT node.

In an embodiment, uplink SC-FDMA using one or more resource blocks is an option in a very similar fashion to LTE or LTE-M when the link budget is available to the node.

In order to increase range, a node may transmit over a unique sub-carrier, for example, and repeat the transmission in subsequent symbols and subframes. By using a unique subcarrier, we achieve near zero PAPR. Repetition enables increasing the range while decreasing the data rate. Pilots are unnecessary in this case and DBPSK can be more efficient (e.g., Sigfox). Hopping, every group of bits, between pre-selected subcarriers provides diversity as long as convolution coding and bit interleaving are used.

Using a unique tone with pure repetition, however, limits the data rate substantially for a given node. The data rate can be increased by overlaying Hadamard codes over a given subcarrier of 15 kHz (in LTE, one subcarrier is 15 kHz, equal to the non-coherency bandwidth proposed previously). Hence, rather than transmitting the subcarrier using pure repetition equivalent to a cover sequence of [+1, +1, +1, +1, . . . ] over the OFDM symbols, a Hadamard cover code can be applied such as [+1, +1, −1, −1, . . . ] (one per OFDMA symbol), or any another Hadamard sequence. The base station decodes each symbol using its regular FFT engine for normal traffic. Extracts the subcarrier of interest used by the node. Then it combines the value form different symbols by using the cover sequence (of all ones or other).

The advantage of the above scheme over NB-IoT's narrowband subcarriers is that there is almost no modification needed to the eNB hardware, which can use the same FFT as usual. A post processing task combines the outputs from a given subcarrier (or hopping subcarrier) according to various Hadamard codes over multiple symbols.

Roaming

The node could be preprogrammed with all allowed licensed bands to monitor. But in order to simplify the roaming task as well as initial setup, the unlicensed band(s) can be used, very occasionally, for first time setup and for reconfiguration when the node no longer hears the pre-assigned licensed band. The node sends a random-access message in uplink in the unlicensed band, and the network responds in downlink in the unlicensed band with a message containing information on the licensed bands (or unlicensed bands) where the node should camp on.

In other words, when a node can no longer find the network on the frequency band it was assigned to, or during the first-time setup, rather than searching all licensed bands (a time-consuming operation), the node may send a short uplink signal on one or more (potentially worldwide) available unlicensed bands (868 MHz, 900 MHz, etc.). The 4G or 5G base stations continuously listen to such very low data rate and very robust signals in the unlicensed spectrum, detect them and respond with information on the frequency bands that may be used in the licensed spectrum.

This solution may require a hardware addition to the 4G base station in order to access the unlicensed band. The LoRa or Sigfox system could be used alternatively in order to handle this rare event until the node switches to licensed band(s).

In summary, when an IoT node fails to receive any IoT-SFN-LSB or valid IoT-SIB, it may decide to restart a full search as it may have been moved to a different region or country. In order to save the resources of the IoT node this procedure is performed over unlicensed band such as IMT band 870 MHz or 900 MHz that is available worldwide. The base stations listen to such bands and then inform the IoT node what are the valid licensed frequency bands they can camp on. Hence, for quick licensed network discovery, the IoT node uses a worldwide available frequency band such as an unlicensed IMT band.

Compatibility with LTE-M

It may be preferred to reuse as much as possible of the LTE-M standard, at least in a first version of the proposed scheme, in order to be able to reuse the LTE-M chipset with software modifications only, if feasible. For example, after acquiring the IoT-SIB, some types of data transmission could be similar to some extent to LTE-M transmission.

The invention claimed is:

1. A wireless communications method comprising:
   synchronously transmitting, periodically from a base station among synchronized base stations of a single frequency network implementing a single cell network, a common downlink synchronization signal and a system frame number least significant bits signal;
   where the system frame number least significant bits signal contains a portion of a system frame number;
   where the system frame number least significant bits signal is transmitted using a code division multiple access (CDMA) mode and underlays LTE OFDM symbols reserved for at least one of secondary synchronization signal (SSS), primary synchronization signal (PSS), and physical broadcast channel (PBCH) broadcasted signals transmitted by the base station in licensed bands of a cellular system;
   where the common downlink synchronization signal is transmitted in the CDMA mode and underlays the LTE OFDM symbols reserved for the at least one of the secondary synchronization signal (SSS), primary synchronization signal (PSS), and physical broadcast channel (PBCH) broadcasted signals transmitted in the licensed bands of the cellular system;
   where the system frame number indicates timing when a system information block signal will be transmitted;
   where the system information block signal contains information related to downlink and uplink transmission schedules and allocations;
   where the common downlink synchronization signal and the system frame number least significant bits signal are a synchronization signal; and
   where the synchronization signal is designed to not interfere with reception of the broadcasted signals by standard wireless devices by more than 2 dB when an observed signal-to-noise ratio (SNR) without interference is −6 dB.

2. The method of claim 1 where synchronously transmitting periodically takes place every 10-20 milliseconds.

3. The method of claim 1 where the system frame number least significant bits signal comprises a Hadamard or Reed-Muller sequence.

4. The method of claim 1 where the system frame number least significant bits signal comprises a Zadoff-Chu (ZC) or chirp spread spectrum (CSS) or constant amplitude zero autocorrelation (CAZAC) sequence with circular shifts.

5. The method of claim 1 wherein the system frame number least significant bits signal contains at most 7 bits of the system frame number and contains no cyclic redundancy check (CRC) checksum.

6. The method of claim 1 further comprising:
   synchronously transmitting periodically every 160 to 1280 milliseconds, from multiple synchronized base stations of the single-frequency network implementing the single cell network, a system information message comprising traffic scheduling information intended for Internet of things (IoT) devices.

7. The method of claim 1 further comprising:
   receiving, at the synchronized base stations from an Internet of things (IoT) node, a sequence of pre-allocated subcarriers;
   determining, at the synchronized base stations average received powers of the pre-allocated subcarriers, wherein each of the average received powers is an average received power of a corresponding one of the pre-allocated subcarriers;
   transmitting, from one of the synchronized base stations, a downlink message informing the IoT node of a selected subcarrier on which to transmit, wherein the selected subcarrier has a highest average received power among the average received powers.

8. A wireless communications method comprising:
   receiving, by an Internet of things (IoT) device from one or more base stations of a single cell network, a common downlink synchronization signal, a system frame number least significant bits signal, and a system information block signal; and
   transmitting, by the IoT device using reserved and allocated resources, uplink data only after receiving and decoding the system frame number least significant bits signal;
   where the system frame number least significant bits signal contains a portion of a system frame number;
   where the system frame number least significant bits signal is transmitted using a code division multiple access (CDMA) mode and underlays LTE OFDM symbols reserved for at least one of secondary synchronization signal (SSS), primary synchronization signal (PSS) and physical broadcast channel (PBCH) broadcasted signals transmitted in licensed bands of a cellular system;
   where the common downlink synchronization signal is transmitted using the CDMA mode and underlays the LTE OFDM symbols reserved for the at least one of the SSS, the PSS and the PBCH broadcasted signals transmitted in the licensed bands of the cellular system;
   where the system frame number indicates timing when the system information block signal will be transmitted;
   where the system information block signal contains information related to downlink and uplink transmission schedules and allocations;
   where the common downlink synchronization signal and the system frame number least significant bits signal are a synchronization signal; and
   where the synchronization signal is designed to not interfere with reception of the broadcasted signals by standard wireless devices by more than 2 dB when an observed signal-to-noise ratio (SNR) without interference is −6 dB.

9. The method of claim 8 further comprising:
transmitting, from the IoT device in an unlicensed band, IoT device identification information; and
receiving, at the IoT device, a message containing information of frequency bands that the IoT device is assigned to camp on.

10. The method of claim 8 further comprising:
receiving, by the IoT device a message containing power adaptation and modulation scheme information; and
transmitting, from the IoT device, uplink data using the power adaptation and modulation scheme.

11. The method of claim 8 further comprising:
receiving, by the IoT device from several of the base stations, feedback messages containing received uplink quality levels; and
transmitting, from the IoT device, an index identifying a base station having a highest quality level.

12. The method of claim 8 wherein the system frame number least significant bits signal contains at most 7 bits of the system frame number and contains no cyclic redundancy check checksum.

13. The method of claim 1 wherein the common downlink synchronization signal is nearly orthogonal to a PSS sequence.

14. The method of claim 8 wherein the common downlink synchronization signal is nearly orthogonal to a PSS sequence.

* * * * *